H. G. SAAL.
BRAKING MECHANISM.
APPLICATION FILED MAY 4, 1918.
1,293,939.
Patented Feb. 11, 1919.
2 SHEETS—SHEET 1.
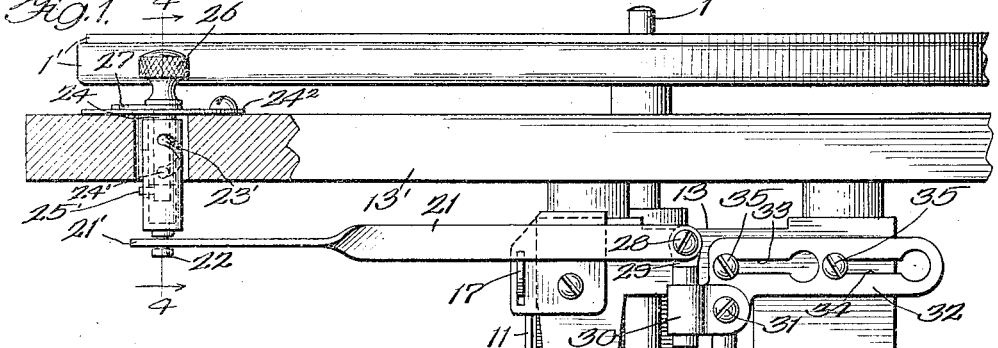
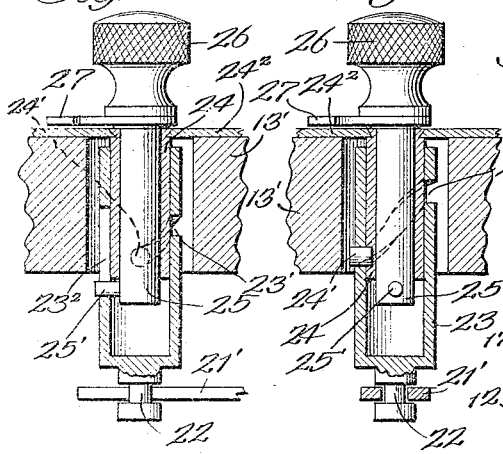
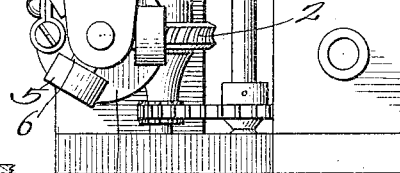
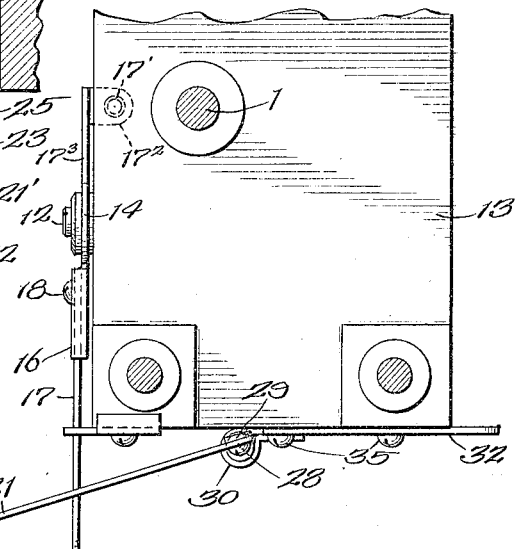
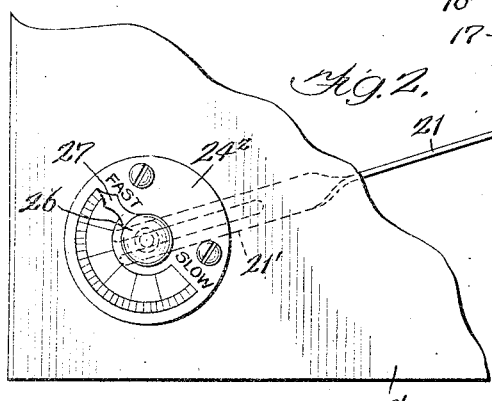
Inventor:
Henry G. Saal.

H. G. SAAL.
BRAKING MECHANISM.
APPLICATION FILED MAY 4, 1918.
1,293,939.
Patented Feb. 11, 1919.
2 SHEETS—SHEET 2.
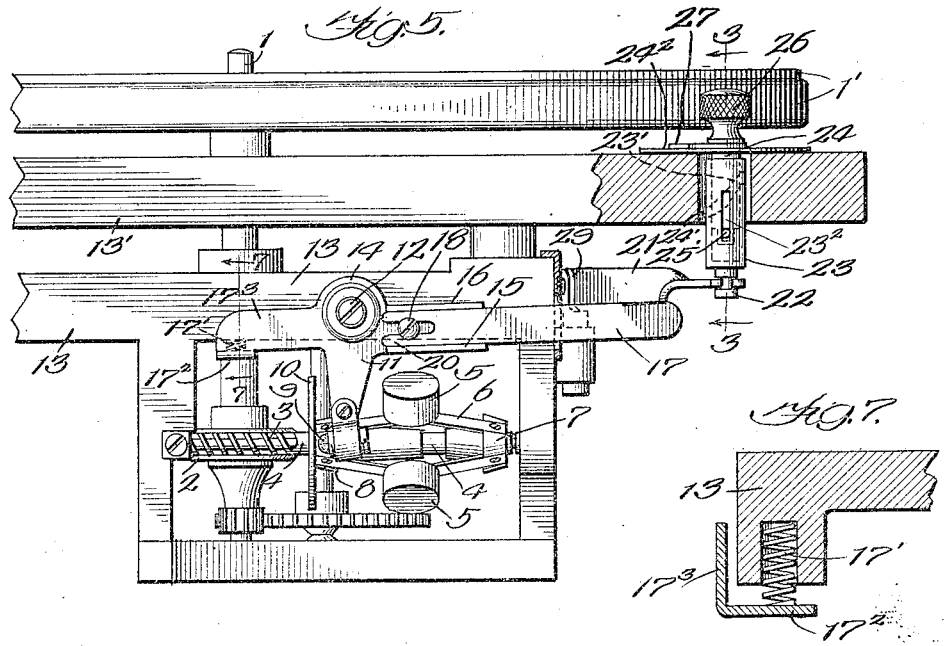
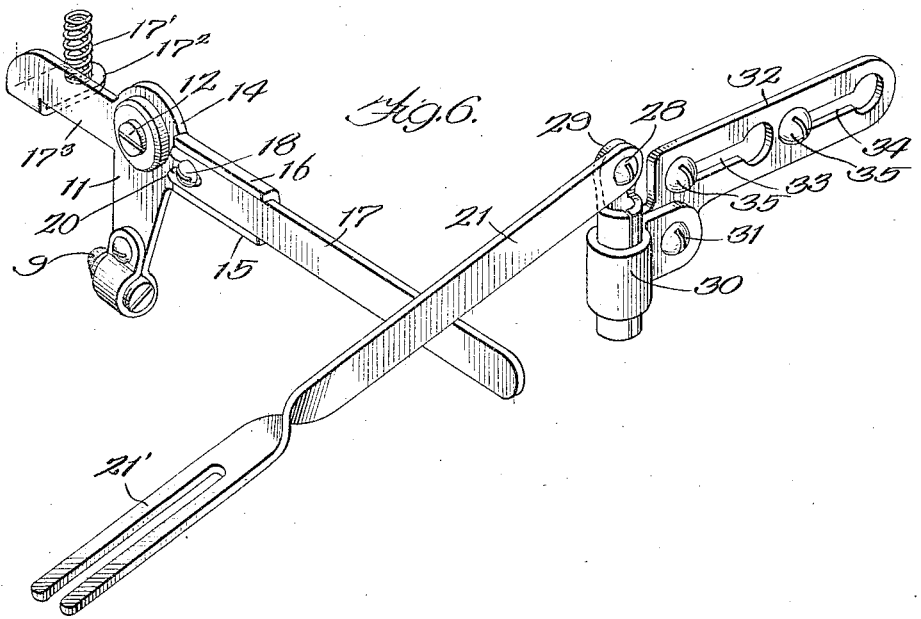
Inventor:
Henry G Saal.
By G. L. Cragg
Atty.

UNITED STATES PATENT OFFICE.

HENRY G. SAAL, OF CHICAGO, ILLINOIS.

BRAKING MECHANISM.

1,293,939.    Specification of Letters Patent.    Patented Feb. 11, 1919.

Application filed May 4, 1918.   Serial No. 232,450.

*To all whom it may concern:*

Be it known that I, HENRY G. SAAL, a citizen of the United States, residing at Chicago, in the county of Cook and State of Illinois, have invented a certain new and useful Improvement in Braking Mechanism, of which the following is a full, clear, concise, and exact description.

My invention pertains to brakes, one feature relating particularly to the lever mechanism that moves one member of a brake with respect to its companion member. The mechanism of my invention is of particular service when employed in connection with brakes that are used for automatically regulating the speed of phonographic record supporting shafts and when my invention is thus embodied it embraces means for adjusting the position of a normally stationary brake member that is engageable by a companion brake member whose movement is determined by the speed of the record supporting shaft.

Another feature of my invention relates particularly to the lever operating means which, in a phonograph, is in the nature of a dial structure and coöperating parts whereby suitable adjustments of the lever mechanism may be easily effected to secure desired speed.

My invention has for one of its objects the improved relation of correlated levers whereby the assembly thereof may readily be effected and maintained in the various adjustments of the levers and has for another of its objects the provision of an improved mounting for one of the levers whereby a given lever mechanism may readily be adjusted for calibration and to adapt the lever mechanism to differing environments.

In carrying out the first of these objects of the invention I employ a bell crank in actuating relation to a brake member, a lever crossing an arm of the bell crank, a side of this bell crank arm engaging a side of said lever, a spring operating upon the bell crank to position it and to maintain its aforesaid arm in engagement with said lever, and means for shifting the fulcrum of said lever.

In carrying out the second object of the invention I employ means for shifting the fulcrum of the lever that crosses the bell crank, this means preferably enabling the direction of the fulcrum axis to be changed. Means are also desirably provided for bodily shifting the position of the fulcrum toward and from the bell crank.

The lever operating means of my invention includes certain interrelated and coöperating parts which will be fully described in connection with the accompanying drawings that show all of the features of my invention as they are preferably employed. In the drawings Figure 1 is a view in elevation of a structure made in accordance with my invention, a cabinet portion being shown in section; Fig. 2 is a plan view of some of the structure shown in Fig. 1, parts being removed and broken away to make the illustration clearer; Fig. 3 is a sectional view on line 3—3 of Fig. 5; Fig. 4 is a sectional view on line 4—4 of Fig. 1; Fig. 5 is another elevation of the structure appearing in Fig. 1 with the lever mechanism in different adjustment; Fig. 6 is a perspective view of the lever mechanism; and Fig. 7 is a view on line 7—7 of Fig. 5.

Like parts are indicated by similar characters of reference throughout the different figures.

The governor illustrated is shown as being associated with a shaft 1 that is adapted for the operation of a turn table $1^1$ for supporting a disk phonographic record, this shaft supporting a worm wheel 2 engageable by a worm 3 provided upon the governor shaft 4. In accordance with common practice the shaft 1 is driven by a spring motor through gearing which is not illustrated, the gear wheel $2'$ being added in order that the shaft 1 may drive the worm 3 to rotate the governor shaft 4 for the purpose of operating the centrifugal governor 5 to maintain the speed of the turntable substantially constant. This centrifugal governor is of a common form, the weights thereof being mounted upon intermediate portions of the resilient strips 6. Each of these resilient strips is mounted at one end upon a sleeve 7 rigidly secured to the shaft 4, the other end of the resilient strip being connected with a collar 8 that is movable along the shaft 4 and with respect to the brake pad 9. The collar 8 is in fixed relation to a brake disk 10 which engages the pad 9 when the governor shaft 4 reaches a predetermined speed whereby the speed of the turn table shaft 1 is controlled.

The brake pad 9 constitutes the normally stationary brake member. The pad is carried at the lower end of the arm 11 of a bell crank whose elbow is pivotally connected at 12 with the case or frame 13 upon which the spring motor and the governor are mounted as a unit, and, as a unit, are attachable to the top board or wall $13^1$ of the phonograph casing. By swinging the bell crank the normal position of the brake pad may be selected to determine the speed at which the motor is to drive the turn table. The other bell crank arm 14 carries two ledges 15, 16 between which a lever 17 is disposed whereby the lever 17 may be held in substantially rigid relation with the bell crank after the clamping screw 18 (which is in threaded engagement with the bell crank) has been turned to have its head brought into clamping engagement with the lever 17. The lever 17 thus constitutes an extension of the bell crank arm 14 and virtually comprises a part of the bell crank. For ease in assembly the end of the lever 17 which is engaged by the screw 18 is of fork shape as indicated at 19, 20, the shank of the screw being received between the branches of the fork. The top edge or side of the other end of the lever 17 is pressed upwardly into engagement with the bottom edge or side of another lever 21 that crosses lever 17. Each lever is engaged with and is slidable along a side of the other, whereby these two levers are very easily assembled or articulated, each lever automatically adapting itself to the other without any manual adjustment at the place of articulation. The spring $17^1$ is employed for the purpose of maintaining engagement between the levers 17 and 21. This spring is mainly housed within a recess formed in the motor frame 13 (Fig. 7), the lower end of this spring projecting clear of said frame into engagement with the ear $17^2$ extending laterally from an arm $17^3$ carried by the bell crank. Through the medium of this arm $17^3$ and its ear $17^2$ pressure is exerted upon the bell crank that tends to move the pad 9 away from the brake disk 10, the spring acting at the same time to press the lever 17 upwardly against the lever 21. The lever 21 has a fork shaped end $21^1$ whose branches are received in the annular groove 22 formed in the lower extension of the cylindrical barrel 23. The barrel 23 has an inclined spiral cam groove $23^1$ that receives a pin $24^1$ projecting radially from a stationary sleeve 24 depending from and rigidly secured to a speed indicating dial $24^2$. The barrel 23 has a straight upright groove or slot $23^2$ that receives a pin $25^1$ projecting radially from a shaft 25 that is journaled within the sleeve 24 and having a fixed plane of rotation. The upper end of this shaft 25 is provided with a knurled gripping piece 26 and a pointer 27, this pointer being adapted for movement over the speed indicating dial $24^2$. By turning the gripping piece 26 the shaft 25 is turned to bring the pointer 27 to that part of the dial that indicates the desired speed and in so doing the barrel 23 is turned by the pin $25^1$ and is moved up and down by reason of the engagement of the pin $24^1$ with the spiral groove $23^1$. By virtue of the ensuing up and down movement of the barrel, the lever 21 is correspondingly moved up and down upon its fulcrum 28. If the lever 21 is moved downwardly the lever 17 is pressed downwardly against the force of the spring $17^1$ to bring the brake pad 9 nearer the disk 10 to reduce the speed of the phonograph. If the lever 21 is moved upwardly the spring $17^1$ will cause the lever 17 to move upwardly to follow the lever 21, the brake pad 9 consequently being withdrawn from the brake disk 10 to increase the speed of the phonograph.

The fulcrum screw 28 furnishes a horizontal axis on which the lever 21 may swing. This fulcrum screw is carried at the upper end of an upright post 29 which is gripped within the clamping sleeve 30 by a clamping screw 31. The sleeve 30 is carried by a mounting plate or element 32 having slots 33, 34 formed therein longitudinally thereof. The stems of the screws 35 enter the motor frame 13 to enable the heads of these screws to clamp said plate in a selected position against said frame. In calibrating the governing mechanism to have the speeds it permits correspond to the dial markings, the screw 31 is loosened to permit the post or mounting 29 to turn on the sleeve or support 30 about the vertical axis afforded by the upright sleeve 30 to change the direction of the fulcrum axis, and the screws 35 are loosened to permit the plate 32 to be moved longitudinally of itself to bring the fulcrum 28 of the lever 21 nearer to or farther from the barrel 23 or the bell crank arm 14—17 thereby to regulate the extent to which a given up or down movement of the barrel will cause or permit movement of the lever 17 and the brake pad 9 connected with this lever. In adjusting the fulcrum the lever having it is moved together with the fulcrum, an adjustment that is permitted by the sliding relation of the lever and bell crank. After the desired calibration has been effected all of said screws are tightened.

The position of the speed indicating dial and the parts in immediate association therewith with respect to the brake mechanism 9, 10 varies in different makes of phonographs. The lever 21, by the mounting thereof which has been described and because of the association thereof with the lever 17 that has been set forth, is readily adapted for assembly with the barrel 23 irrespective of the position of this barrel and the dial above it, this being an advantage in addition to the facility with which the calibration may be effected.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Braking mechanism including a brake member; a bell crank in actuating relation to said brake member; a lever angular to and engaging an arm of the bell crank; a mounting upon which said lever is fulcrumed; a support for said mounting and on which said mounting may be turned to change the direction of the fulcrum axis; and means for holding said support at different distances from the bell crank.

2. Braking mechanism including a brake member; a bell crank in actuating relation to said brake member; a lever angular to and engaging an arm of the bell crank; a mounting upon which said lever is fulcrumed; and a support for said mounting and on which said mounting may be turned to change the direction of the fulcrum axis.

3. Braking mechanism including a brake member; a bell crank in actuating relation to said brake member; a lever crossing an arm of the bell crank, each engaging and being slidable along a side of the other; a spring operating upon the bell crank to position it and to maintain its aforesaid arm in engagement with said lever; and a support for the fulcrum of said lever which is shiftable toward and from said bell crank arm.

In witness whereof, I hereunto subscribe my name this twentieth day of April A. D., 1918.

HENRY G. SAAL.

Copies of this patent may be obtained for five cents each, by addressing the "Commissioner of Patents, Washington, D. C."